No. 787,048. PATENTED APR. 11, 1905.
H. J. S. LEWIS.
SHOW CASE.
APPLICATION FILED FEB. 2, 1904.

Witnesses
Julius H. Hirtz
John Lotka

Inventor
Herman J. S. Lewis
By his Attorneys Briesen Knauth

No. 787,048. PATENTED APR. 11, 1905.
H. J. S. LEWIS.
SHOW CASE.
APPLICATION FILED FEB. 2, 1904.
6 SHEETS—SHEET 4.

WITNESSES: INVENTOR
H. J. S. Lewis
BY
ATTORNEYS

No. 787,048. PATENTED APR. 11, 1905.
H. J. S. LEWIS.
SHOW CASE.
APPLICATION FILED FEB. 2, 1904.

WITNESSES:

INVENTOR
H. J. S. Lewis
BY
ATTORNEYS

No. 787,048.
Patented April 11, 1905.

UNITED STATES PATENT OFFICE.

HERMAN J. S. LEWIS, OF NEW YORK, N. Y., ASSIGNOR, BY MESNE ASSIGNMENTS, TO FLORENCE EXHIBITOR SYSTEM, OF NEW YORK, N. Y., A CORPORATION OF NEW YORK.

SHOW-CASE.

SPECIFICATION forming part of Letters Patent No. 787,048, dated April 11, 1905.

Application filed February 2, 1904. Serial No. 191,655.

*To all whom it may concern:*

Be it known that I, HERMAN J. S. LEWIS, a citizen of the United States, and a resident of the borough of Manhattan, city, county, and State of New York, have invented certain new and useful Improvements in Show-Cases, of which the following is a specification.

My invention relates to show-cases or like apparatus in which a series of receptacles, trays, or holders are given an intermittent motion in a predetermined path, so that such holders are brought into view successively to the same position and are also allowed to remain at rest in that position for a while. Thus the articles in or upon such holders may be viewed very conveniently. I prefer to provide a motor for moving the holders, so that they will change their position at regular intervals. However, a simple crank or other mechanism operated by an attendant may be employed.

The apparatus may be used as a display-cabinet or show-case or as a filing-cabinet, the advantage in each case being that a very large capacity is obtained in a relatively restricted space.

The invention will be fully described hereinafter and the features of novelty pointed out in the appended claims.

Reference is to be had to the accompanying drawings, in which—

The apparatus comprises a suitable frame or casing, which may comprise a base A and a box-like structure A', preferably made entirely of glass. Within this frame are secured two supporting-plates B, which serve as supports and guides for certain parts of the mechanism and also for the trays or holders. The trays or holders shown in the drawings consist of top plates 1 and parallel side plates 2, extending downwardly therefrom, the ends of the holders being open, as shown in the upper left-hand corner of the holder in Fig. 2. Each of the holders is provided with ribs 3 on the sides, said ribs 3 being adapted to move in guideways 4 and 5, provided upon the inner face of each of the supporting-plates B. Into the guideway 4 is adapted to project a sliding latch D, pressed into the guideway in any suitable manner—for instance, by means of a weighted lever E, pivoted at E'. The lower surface of said latch is rounded at the end, so that when one of the trays or holders rises it will push the latch D aside, said latch springing back to its original position as soon as the rib 3 has cleared the latch. Thus the holders can move only upward in the guideway 4. Into the guideways 5 project latches F, which may be similar to the latches D, except that it is not necessary to round or bevel the lower surface of the latches F. The position of each latch F is positively controlled by an elbow-lever G, fulcrumed at G' and connected by a link H with the crank-arm I upon the end of a rock-shaft J. This rock-shaft carries a weighted arm J', so that the tendency of the weight is to project the latches F into the guideways 5, as shown best in Fig. 2. It will be understood that as long as the latches F are in this position the holders cannot move downward in said guideways 5 beyond the latches F. In order that the holders in the guideways 5 may be released at certain times, as hereinafter described, the arm J' is adapted to be periodically engaged by a projection or cam K' on the main shaft K. This shaft may be turned by hand, if desired, or a motor may be provided for this purpose. In Figs. 7, 8, 9, 10, and 11 I have shown an electric motor L with driving-belt M running to a pulley on the shaft K, which may also be the operating means used in connection with the apparatus shown in Figs. 1 to 5.

Figure 1:
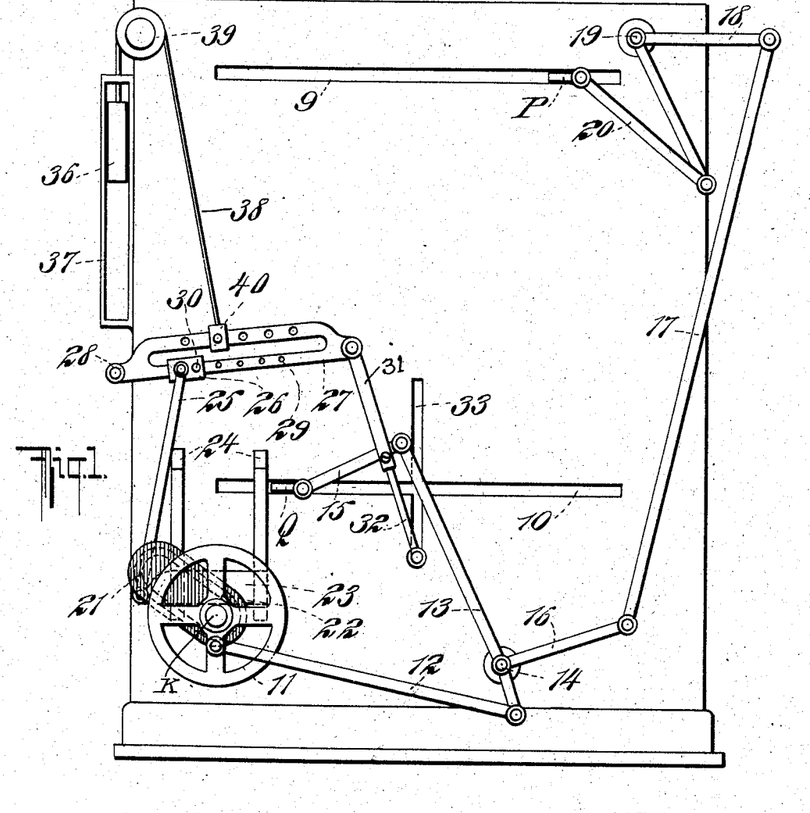
Figure 1 is an end view of the device.
Figures 2, 4:
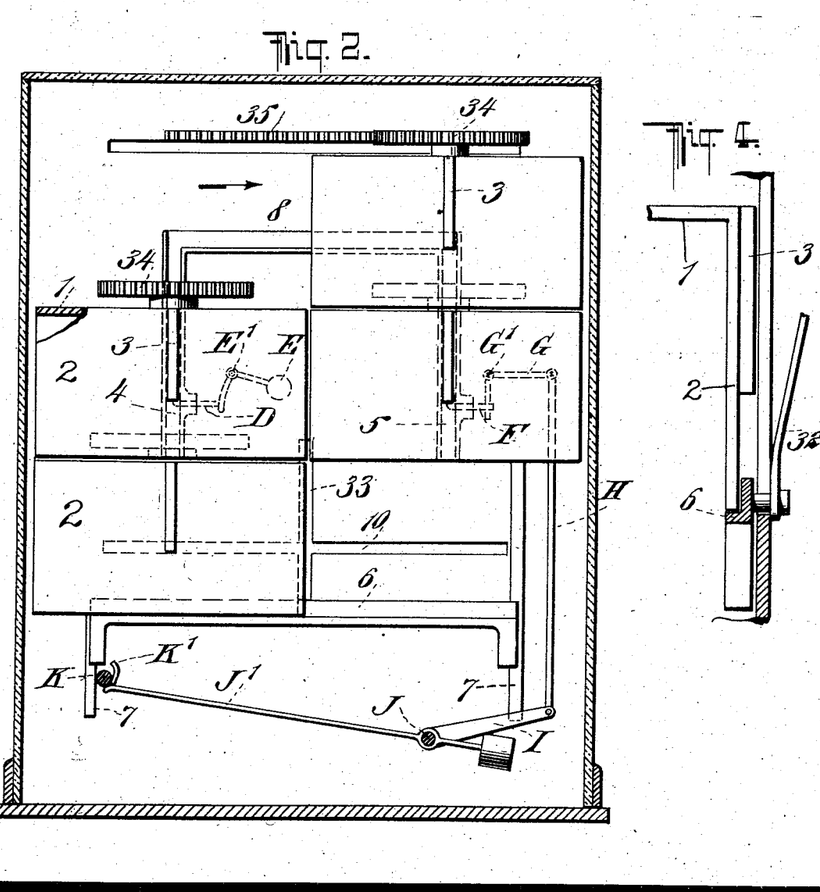
Fig. 2 is an end view with the casing in section.
Fig. 4 is a detail of the support for the trays.
Figure 3:
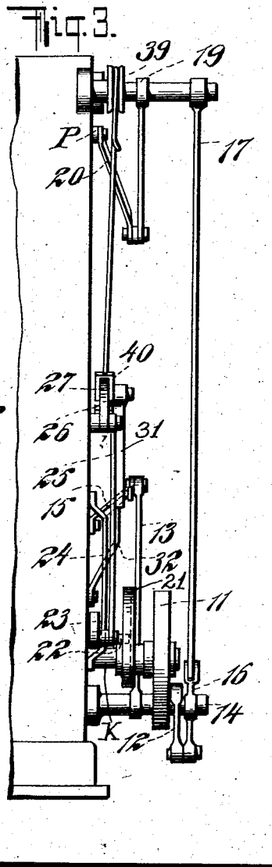
Fig. 3 is a partial front view of the device.
Figure 5:
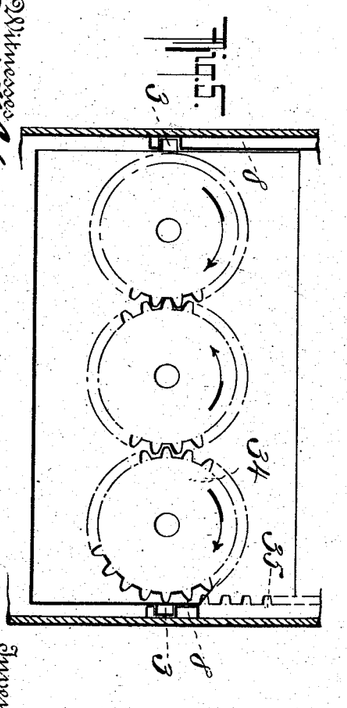
Fig. 5 is a partial plan view.
Figure 6:
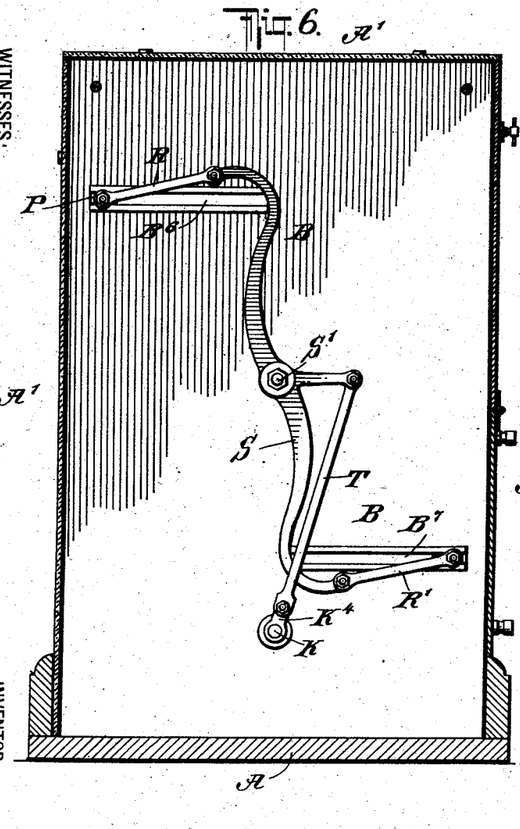
Fig. 6 is an end view, with the casing in section, of a slightly different form of my invention.
Figure 7:
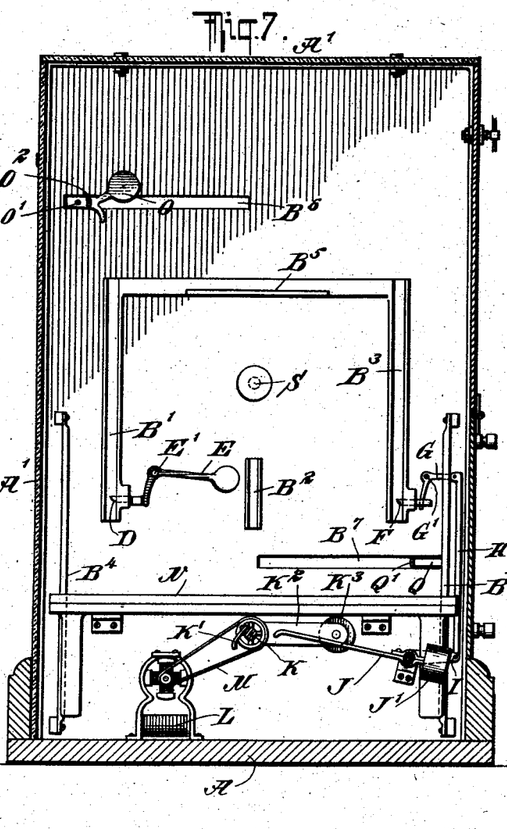
Fig. 7 is a cross-section thereof on line 7 7 of Fig. 11.
Figure 8:
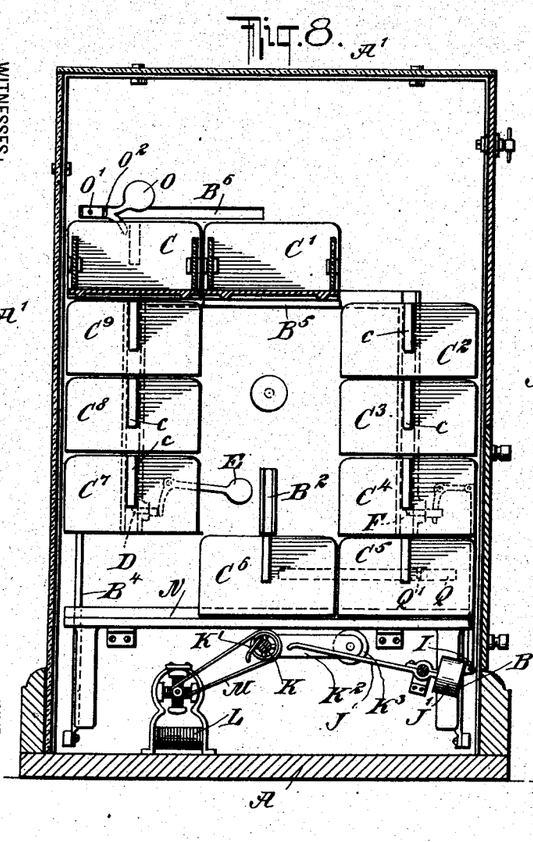
Figs. 8, 9, and 10 are cross-sections thereof substantially on the line 8 8 of Fig. 11 and show the mechanism and the holders in three different positions.
Figure 9:
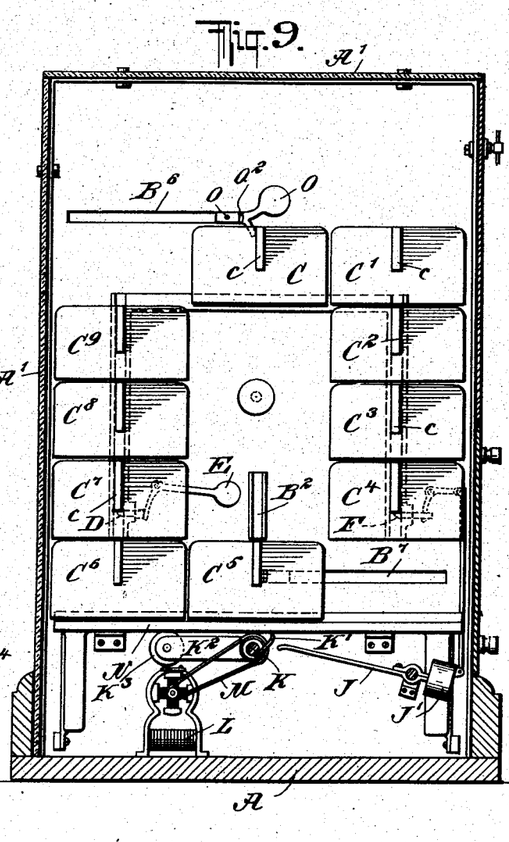

The upper ends of the guideways 4 and 5 are connected by a guideway 8. At a point somewhat above this guideway 8 a carrier is arranged to move on a horizontal track 9, this carrier being adapted to engage the rib 3 of one of the holders and to move the holder along the guideway 8. The carrier is shown best in Fig. 7 and consists of a weighted lever O, pivoted at O' to a slide P and having a rocking movement limited, for instance, by a pin-and-slot connection $O^2$. This weighted lever O will slip over the ribs 3 when moving in one direction and will feed the holders only when moving in the opposite direction. At the lower portion of the apparatus is arranged a guideway 10, similar to the guideway 9, and in this guideway is mounted to move a slide Q, having a projection Q', (see Fig. 7,) adapted to engage the ribs 3. A wheel or disk 11 is mounted on the shaft K, and a connecting-rod 12 imparts motion to a rocking lever 13, fulcrumed at 14, and which at one end is connected by a link 15 to the slide Q, working in the guideway 10, this slide moving the holders horizontally when they are in their lower position. The lever 13 has a projecting arm 16, which is connected, by means of a link 17, to one arm of a bell-crank lever 18, fulcrumed at 19, the other arm of the said bell-crank being connected, by means of a link 20, to the slide P for moving the holders horizontally in a direction opposite to that in which the slide Q moves the said holders. The holders are adapted to rest at times upon supports 6, adapted to slide up and down on guideways 7. In order to operate the supports 6, the shaft K carries a cam 21, the groove of which receives a pin 22, projecting from a slide 23. It will be understood that this arrangement is duplicated at each side of the machine. The slide is guided by bars 24 and is pivotally connected with a link 25, the upper end of which is loosely secured to a sleeve 26. This sleeve is adjustable upon a lever 27 toward and from the fulcrum 28 of said lever—for instance, by providing a series of apertures 29, adapted to receive a pin which also passes through a corresponding aperture 30 of the sleeve. The lever 27 is connected by a link 31 32 with the lifter or support 6, on which the lowermost tray or holder is adapted to rest, as shown in Fig. 2. This support is movable in guides 33. It will be understood that the slide Q and the link 15 have been moved to the right in Fig. 1 out of the path of the link 31 32 before the lifting action takes place. It will be further understood that the slide 23 will always have the same extent of movement; but according as the distance of the sleeve 26 from the pivot 28 is varied the angular movement of the lever 27 may be increased or diminished with the corresponding variation in the movement of the lifter or support 6. With this arrangement I am enabled to employ the same mechanism in conjunction with holders or trays of different heights. The purpose of making the link 31 32 of two slidably-connected or telescopic connections is to enable said link to be so adjusted that the lifter 6 will always descend to the same point notwithstanding the variations in the stroke of the lifter.

Each of the holders or trays carries a plurality of journaled plates or tables 34, mounted to turn about vertical axes and provided with intermeshing gear-teeth. These tables project above the top 1 and are adapted to carry any suitable articles to be displayed. The ends of the holders are left open, so that the tables 34 and the articles thereon may not interfere with the horizontal motion of the holders.

At the upper portion of the apparatus within the casing is arranged a rack 35, adapted to engage with the teeth of the adjacent turn-table 34 when the uppermost holder moves in the direction indicated by the arrow in Fig. 2. The rack is preferably so arranged as to be at a little distance from the gear-teeth when the holder comes into its uppermost position, so that there is no danger of the turn-table teeth striking against those of the rack during the upward movement of the holder. As the holder moves horizontally the turn-table teeth engage the rack 35, and all the turn-tables are rotated, the extent of the turning movement depending on the length of the rack. For instance, a half-revolution may be given. Thus every time a holder comes up to the top position it will present a different view of the articles on the turn-tables. Inasmuch as the holders resting on the lifter oppose a considerable resistance to the movement thereof a counterbalancing device is desirable, and it is also advantageous to provide for the adjustment of such counterbalancing device, since the weight of the goods carried by the holder may vary. As shown, this counterbalancing device consists of a weight 36, movable between guides 37 and connected by a wire 38, passing over a pulley 39, with a sleeve 40 adjustable on the lever 27 toward and from its fulcrum in substantially the same manner as the sleeve 26. The sleeve 40 is provided only at one side of the machine, and at the other side the lever 27 is reproduced without the upper portion carrying the sleeve 40, it being understood that both levers 27 are rigidly connected through the medium of their fulcrum-shaft. It will be understood that this counterbalancing device may be applied to either of the structures illustrated by Figs. 1 to 11.

In Figs. 6, 7, 8, 9, 10, and 11 I have illustrated a slightly different arrangement of the trays or holders, which I will now describe, it being understood that the casing and the latches may be substantially the same as described in regard to device illustrated by Figs. 1 to 5, inclusive. For the sake of convenience I have numbered the trays illustrated by Figs. 6 to 11 consecutively from C to $C^9$. The trays employed in this construction consist of boxes open at the top and provided at their ends with projections or ribs $c$. These ribs are adapted to fit into vertical guides $B'$ $B^2$ $B^3$, provided upon the inner face of each of the supporting-plates B. The guides $B'$ and $B^3$ are similar to the guides 4 and 5. (Shown in Fig. 2.) Into the guideway $B'$ is adapted to project a latch similar to the latch D, and into the guideways $B^3$ project latches similar to the latch F, both as shown and described in regard to Figs. 1 to 5. In order to operate these supports, arms $K^2$ are mounted on the shaft K. These arms are provided at their free ends with rollers $K^3$, arranged to engage the supports N. These supports return to their lower position, Fig. 7, simply by gravity. When in this position, the supports N form a horizontal track or guideway for the lowermost holders, and the position of the latches D F relatively to the lower position of the supports N is such as to accommodate just one row of holders below those held by the latches. This is also true of the structure illustrated by Figs. 1 to 5. The upper ends of the guideways $B'$ $B^3$ are connected by a horizontal guideway $B^5$, and at a point somewhat above this guideway $B^5$ a carrier is arranged to move on a horizontal track $B^6$, the said carrier being constructed in the same manner as described with regard to the structure illustrated in Figs. 1 to 5. This carrier is adapted to engage the rib $c$ of one of the holders and to move said holder along the guideway $B^5$. At the lower portion of the apparatus is arranged a guideway $B^7$, similar to the guideway $B^6$ and corresponding to the guideway 10 of Figs. 1 and 2. In this guideway is mounted to move a slide similar to the slide Q, the detail construction of which has been described in regard to the structure shown by Figs. 1 to 5. In one of its extreme positions the projection $Q'$ lies outside of the ribs $c$, traveling in the guideway $B^3$. In the form of my invention which I am now describing each of the slides P and Q is connected by a link R and $R'$, respectively, with a three-armed lever S, fulcrumed at $S'$ and connected by a connecting-rod T with a crank-arm $K^4$ on the main shaft K. It will be understood that all these parts are duplicated on each side of the machine.

Figure 10:
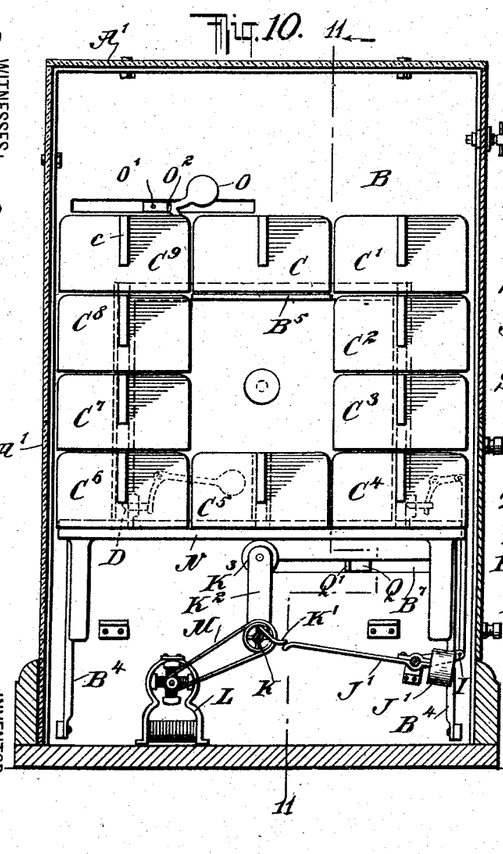
Figure 11:
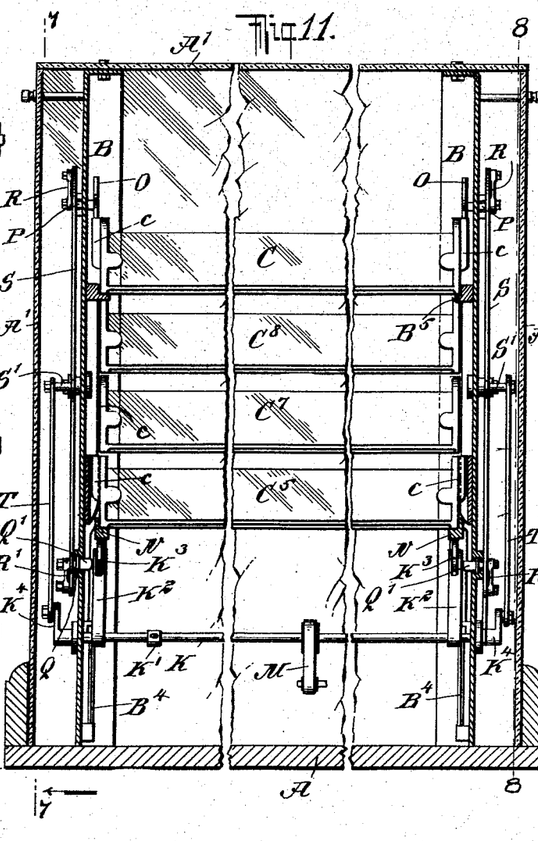
Fig. 11 is a section on line 11 11 of Fig. 10.

The operation is as follows: In the position illustrated by Fig. 8 the latches D hold up the holders $C^7$, $C^8$, $C^9$, and C. The holders $C^2$ $C^3$ $C^4$ are supported by the latches F and the holders $C^5$ $C^6$ rest on the supports N, which are in their lowermost position. The carriers O are in front of the ribs $c$ of the holder C and the projections $Q'$ are in the rear of the ribs $c$ of the holder $C^5$. Now as the shaft K rotates the lever S will be rocked, so as to simultaneously move the carriers O to the right and the projections $Q'$ to the left. The holders C $C'$ and $C^5$ $C^6$ will thus be transferred to the position illustrated by Fig. 9, the other holders remaining in their former positions. When this has happened, the ribs $c$ of the holders $C^5$ $C^6$ will be below the lower ends of the guideways $B^2$ $B'$, respectively. Now as the shaft K continues to rotate the rollers $K^3$ on the arms $K^2$ will raise the supports N, and thus lift the holders $C^5$, $C^6$, $C^7$, $C^8$, and $C^9$ to the position illustrated by Fig. 10. The latches D will, as previously explained, be pushed aside by the ribs $c$ and then automatically catch under the ribs $c$ of the holder $C^6$. At the same time the slides P and Q will begin to return to their former positions, and during this movement the carriers O will swing on their pivots $O'$ as soon as they engage the ribs $c$ of the holder $C^9$, so that they will get to a position to the left of the said ribs exactly as shown of the holder C in Fig. 8. As the lowermost row of holders is raised beyond the path of the projections $Q'$, there is no need of employing the same structure on the lower slides as on the upper ones; but said projections $Q'$ may be rigid with their slides Q. At about the time that the supports N reach their highest position the arm or cam $K'$ engages the end of the arm $J'$, as shown in Fig. 10, and thus slides the latches back, so as to release the holders $C^4$ $C^3$ $C^2$ $C'$. Therefore when the supports N drop back to their initial position the holders $C'$, $C^2$, $C^3$, $C^4$, and $C^5$ will follow them in their movement, while the other trays will remain stationary, being held by the latches D and by the guideway $B^5$. The holders thus come to a position substantially identical with the one shown in Fig. 8, except that different trays are now at the top—that is, while in Fig. 8 the holders C and $C'$ are at the top the holders $C^9$ and C will be at the top when the mechanism again reaches the same position. Thus the same operations are repeated over and over again, each time bringing another tray to the top, so that the contents of the various trays or holders are successively exposed to view. It will be seen that the movement is intermittent—that is, each tray remains stationary for a time and each tray remains stationary at three different points while it is in the top row. Thus ample time is given to inspect the contents of each holder.

It will be understood that the number of trays may be increased or diminished without any material change in the mechanism.

The apparatus may be used for displaying goods of any description or it may be employed as a filing-cabinet for papers or other objects, and in each case the apparatus presents the great advantage of enabling a large number of objects to be stored within a relatively small volume and to be brought into position for ready inspection.

It is to be understood that while I have specifically described the operation of the structure illustrated by Figs. 6 to 11, inclusive, the same description also applies substantially to the structure shown in Figs. 1 to 5, inclusive, the main difference being that the trays in this form are closed at the top and open at the bottom and ends and are provided at the top, as before explained, with turn-tables 34, arranged to engage racks 35 when the holders are in their upper position, so that the said turn-tables will be rotated as the holders are moved horizontally on the guideway 8, thus displaying various views of the object or objects exhibited on said turn-tables.

Figure 12:
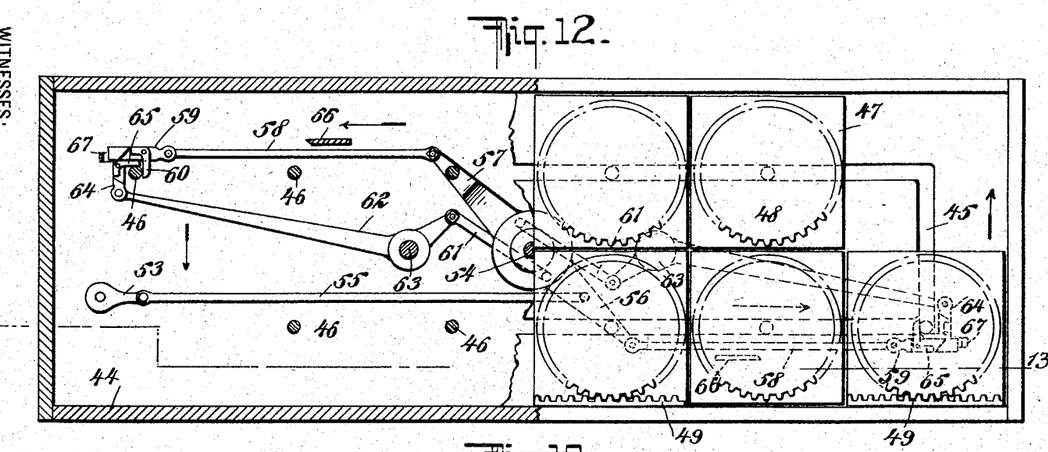
Fig. 12 is a plan, with parts in section, of still another form of my invention.
Figure 13:
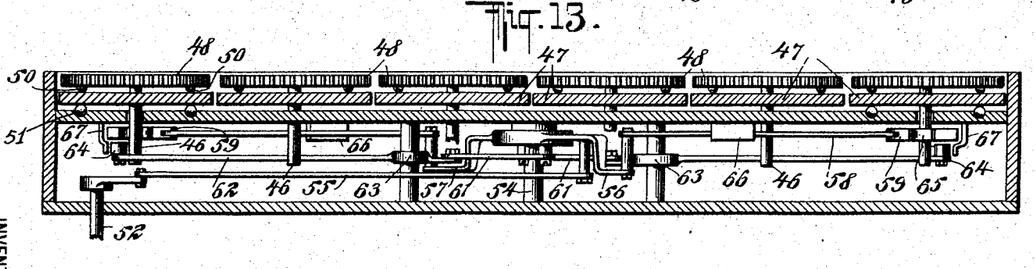
Fig. 13 is a section on line 13 13 of Fig. 12.

In Figs. 12 and 13 I have illustrated a frame 44, having a rectangular horizontal guideway 45, adapted to be engaged by pins or shafts 46, projected from the holders 47. These holders are shown as simply square plates. Each holder is provided with a turn-table or carrier 48, provided with gear-teeth, which are adapted to engage at proper times with rack portions 49, secured to the frame or case 44. Bearing-balls 50 may be interposed between the turn-table 48 and the holders 47. Similarly, the movement of the holders relatively to the frame or case may be facilitated by the use of friction-balls 51. It will be understood that in this case also the number of holders is such as to leave a gap at the upper right-hand corner of Fig. 12 and a corresponding gap at the lower left-hand corner of said Fig. 12 and the position of these gaps is changed by moving sundry of the holders while leaving others temporarily stationary. The mechanism for conveying the holders from one position to another is of the same character as before described, although there is no lift movement, since the holders always remain at the same level. The power-shaft is designated as 52 and has a crank-arm 53, from which an oscillating motion is imparted to a rock-shaft 54 by means of a link 55 and arm 56. At the end of this arm 56 and of another arm, 57, arranged oppositely thereto, are attached operating-rods 58, connected with slides 59, each of which is provided with a pivoted projection 60. These projections are adapted to engage the pins 46 or equivalent members on the holders 47, and thus to move in the direction indicated by the arrows in Fig. 12. When, however, the operating-rods 58 move in the opposite direction, the pivoted projections 60 swing aside without any action on the holders. With the rock-shaft 54 are also connected by links 61 oscillating levers 62, fulcrumed at 63, which at their free ends are connected with slides 64, provided with projections 65, arranged to operate in the same manner as the projections 60—that is, when the lever 62 swings in one direction the projections 65 will carry one of the holders 47 to the other side of the case and when the lever 62 swings in the opposite direction the projections will yield, so as to get back into the position illustrated at the upper left-hand corner of Fig. 12. If desired, springs may be provided to bring the projections 60 65 to the positions shown, or the projections may collide with stationary abutments 66 67. It will be understood that according to the location of the rack portions 49 a great variety of effects may be obtained, the articles supported by the turn-tables or carriers 48 being successively exposed from different sides, so as to be clearly in view.

I claim as my invention and desire to secure by Letters Patent—

1. In a device of the character described, a set of holders arranged in a plurality of runs or portions forming together a practically-continuous series, and means for alternately feeding and allowing to remain stationary, the holders of each of said runs or portions.

2. In a device of the character described, a frame, a set of holders arranged to travel and means for feeding successive portions of said holders while leaving the remainder stationary.

3. In a device of the character described, a frame, a set of holders arranged in an approximately continuous series with an intervening gap, and means for successively moving different portions of the set to change the position of the said gap.

4. In a device of the character described, a set of holders arranged in an approximately continuous series with an intervening gap, a shaft, and feeding devices controlled by turning the said shaft, for successively moving different portions of the set to change the position of the said gap.

5. In a device of the character described, a set of holders, a frame having guideways to arrange said holders in two columns, and certain of said holders in a top row and others in a bottom row, and means for bringing about a movement of the holders in opposite directions in the two columns.

6. In a device of the character described, a set of holders, a frame having guideways to arrange said holders in two columns, and certain of said holders in a top row and others in a bottom row, feeding devices for moving the top row in one direction and simultaneously moving the bottom row in the opposite direction, and means for bringing about a movement of the holders in opposite directions in the two columns.

7. In a device of the character described, a set of holders, a frame having guideways to arrange said holders in two columns, and certain of said holders in a top row and others in a bottom row, slides movable adjacent to said rows and arranged to move the respective holders in opposite directions, and means for bringing about a movement of the holders in opposite directions in the two columns.

8. In a device of the character described, a set of holders, a frame having guideways to arrange said holders in two columns, and certain of said holders in a top row and others in a bottom row, means for moving the holders of said rows in opposite directions, latches for holding the holders in the said columns in an elevated position, means for lifting the holders in one column, and means for releasing the latching device in the other column.

9. In a device of the character described, a set of holders, a frame having guideways to arrange said holders in two columns, and certain of the holders in a top row and others in a bottom row, means for moving the holders of said rows in opposite directions, latching devices for maintaining the holders in the columns in an elevated position, a vertically-movable support for raising the holders in one column, and means for releasing the latching device in the other column.

10. In a device of the character described, a set of holders, a frame having guideways to arrange said holders in two columns, and certain of said holders in a top row and others in a bottom row, a lifting device for elevating the holders in one column, and a counterbalancing mechanism connected with said lifting device.

11. In a device of the character described, a set of holders, a frame having guideways to arrange said holders in two columns, and certain of said holders in a top row and others in a bottom row, a lifting device for lifting the holders in one column, a counterbalancing device connected with said lifting device, and means for adjusting the action of the counterbalancing device.

12. In a device of the character described, a set of holders, a frame having guideways to arrange said holders in two columns, and certain of said holders in a top row and others in a bottom row, a lifting device for elevating the holders in one column, a lever pivoted to the frame, a counterbalance connected with said lever, and a slide movable on said lever and connected with said lifting device.

13. In a device of the character described, a set of holders, a frame having guideways to arrange said holders in two columns, and certain of said holders in a top row and others in a bottom row, a lifting device for elevating the holders in one column, a lever pivoted to the frame, a counterbalance connected with said lever, a slide movable on said lever and connected with said lifting device, and an adjusting-screw journaled in said lever and engaging said slide.

14. In a device of the character described, a frame, a set of holders, means for moving the holders in a predetermined path, platforms or supports mounted to turn on the holders and stationary racks for turning said platforms by the movement of the holders.

15. In a device of the character described, a frame, a set of holders, means for moving said holders in a predetermined path, platforms or supports mounted to turn on said holders and means carried by the frame for causing the said supports to turn as the holders move.

16. In a device of the character described, a frame, a set of holders, means for causing said holders to travel in a predetermined path, platforms or supports mounted to turn on said holders, and means for turning said supports.

17. In a device of the character described, a set of holders, a frame having guideways to arrange said holders in two columns, and certain of said holders in a top row and others in a bottom row, means for causing said holders to travel in a predetermined path, platforms or supports mounted to turn on said holders, and means located adjacent to said top row, for causing the supports to turn as the respective holders travel in said row.

18. In a device of the character described, a set of holders, a frame having guideways to arrange said holders in two columns, and certain of said holders in a top row and others in a bottom row, means for causing said holders to travel in a predetermined path, platforms or supports mounted to turn on said holders, and means located adjacent to one of said rows for causing the said supports to turn as the respective holders travel in the said row.

19. In a device of the character described, a frame, a set of holders arranged to travel, means for successively feeding a portion of said holders while leaving the remainder stationary, turn-tables or carriers mounted to turn on said holders, and means for turning said carriers.

20. In a device of the character described, a frame, a set of holders arranged to travel, means for successively feeding a portion of said holders while leaving the remainder stationary, turn-tables or carriers mounted to turn on said holders, and means for turning said carriers by the movement of the holders.

21. In a device of the character described, a frame, a set of holders arranged to travel, means for successively feeding a portion of said holders while leaving the remainder stationary, turn-tables or carriers mounted to turn on said holders, and a rack arranged on the frame and adapted to turn the said carriers as the holders travel relatively to the frame adjacent to the rack.

22. In a device of the character described, a frame, a set of holders arranged to travel, means for successively feeding a portion of said holders while leaving the remainder stationary, geared turn-tables or carriers mounted to turn on said holders, and a rack arranged on the frame and adapted to mesh with one of the geared carriers on each holder to rotate said carriers as the holders travel adjacent to the rack.

23. In a device of the character described, a set of holders arranged in an approximately continuous series with an intervening gap and arranged to move in a path lying in a vertical plane, means for moving the holders at the top and at the bottom in opposite directions and about horizontally, a lifter for raising sundry of the holders, and a counterbalancing device connected with said said lifter.

24. In a device of the character described, a set of holders arranged in an approximately continuous series with an intervening gap and arranged to move in a path lying in a vertical plane, means for moving the holders at the top and at the bottom in opposite directions and about horizontally, a lifter raising sundry of the holders, a counterbalancing device connected with said lifter, and means for adjusting the connection of the counterbalancing device with the lifter.

25. In a device of the character described, a set of holders, a frame having guideways to arrange said holders in two columns, and certain of said holders in a top row and others in a bottom row, feeding devices for moving the top row in one direction and simultaneously moving the bottom row in the opposite direction, a lifter for raising one column of holders, and a counterbalancing device connected with said lifter.

In testimony whereof I have hereunto set my hand in the presence of two subscribing witnesses.

HERMAN J. S. LEWIS.

Witnesses:
 JOHN LOTKA,
 JOHN A. KEHLENBECK.